US012611840B1

(12) United States Patent
Benavente-Notaro

(10) Patent No.: US 12,611,840 B1
(45) Date of Patent: Apr. 28, 2026

(54) ELECTRONIC DEVICES WITH MODIFIED COVERS

(71) Applicant: Apple Inc., Cupertino, CA (US)

(72) Inventor: Linda D. Benavente-Notaro, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 18/219,603

(22) Filed: Jul. 7, 2023

Related U.S. Application Data

(60) Provisional application No. 63/406,654, filed on Sep. 14, 2022.

(51) Int. Cl.

| | |
|---|---|
| *H04R 25/00* | (2006.01) |
| *B32B 3/26* | (2006.01) |
| *B32B 3/28* | (2006.01) |
| *B32B 5/02* | (2006.01) |
| *B32B 5/26* | (2006.01) |
| *H04R 1/02* | (2006.01) |

(52) U.S. Cl.
CPC ............... *B32B 3/28* (2013.01); *B32B 3/266* (2013.01); *B32B 5/026* (2013.01); *B32B 5/26* (2013.01); *H04R 1/028* (2013.01); *B32B 2250/02* (2013.01); *B32B 2250/20* (2013.01); *B32B 2307/10* (2013.01); *B32B 2457/00* (2013.01)

(58) Field of Classification Search
CPC .. B32B 3/28; B32B 3/266; B32B 5/26; B32B 2250/02; B32B 225/20; B32B 2307/10; B32B 2457/00; H04R 1/028

USPC ......................................... 381/386, 387, 345
See application file for complete search history.

(56) References Cited

U.S. PATENT DOCUMENTS

| | | | | |
|---|---|---|---|---|
| 8,389,862 | B2 * | 3/2013 | Arora ........................ | H05K 1/00 |
| | | | | 174/254 |
| 9,894,789 | B1 * | 2/2018 | Hamada .................... | B32B 5/26 |
| 10,631,071 | B2 * | 4/2020 | Wu ........................... | H04R 9/06 |
| 11,206,470 | B1 * | 12/2021 | Gould ................... | H04R 1/2834 |
| 2007/0164632 | A1 * | 7/2007 | Adachi .............. | G01N 29/2437 |
| | | | | 310/311 |
| 2010/0078259 | A1 * | 4/2010 | Stevenson ......... | B29C 66/72141 |
| | | | | 156/92 |
| 2021/0286577 | A1 * | 9/2021 | Ballhatchet ........... | G06F 3/0362 |
| 2022/0038799 | A1 * | 2/2022 | Gribtsov ................ | H04R 1/028 |
| 2022/0070576 | A1 * | 3/2022 | Della Rosa ........... | H04R 1/021 |
| 2022/0319829 | A1 * | 10/2022 | Sheats ..................... | H01L 23/29 |

(Continued)

*Primary Examiner* — William J Deane, Jr.
(74) *Attorney, Agent, or Firm* — BAKERHOSTETLER

(57) ABSTRACT

A fabric assembly for an electronic device includes multiple fabric layers joined together at select locations. The fabric layers each include multiple indentations, or de-bosses. The fabric layers can be combined, or bonded, together at one or more respective indentations. As an example, the indentations can be bonded together through a welding operation, including radio frequency welding. When the fabric assembly is integrated with an electronic device, the fabric assembly permits passage of soundwaves therethrough. The indentations can be equally or unequally spaced throughout each fabric layer. When unequally spaced, the fabric assembly can be positioned over a component of an electronic device such that the locations with few or no indentations are positioned at a location corresponding to the component, thus allowing access to the component.

20 Claims, 10 Drawing Sheets

(56) References Cited

U.S. PATENT DOCUMENTS

2023/0319484 A1* 10/2023 Barsukou ............... H04R 17/02
381/91

* cited by examiner

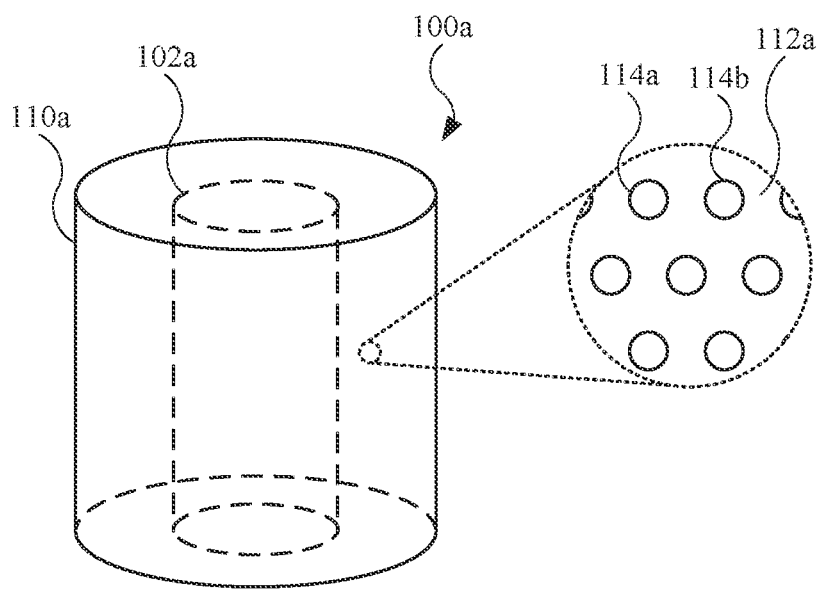
*FIG. 1A*
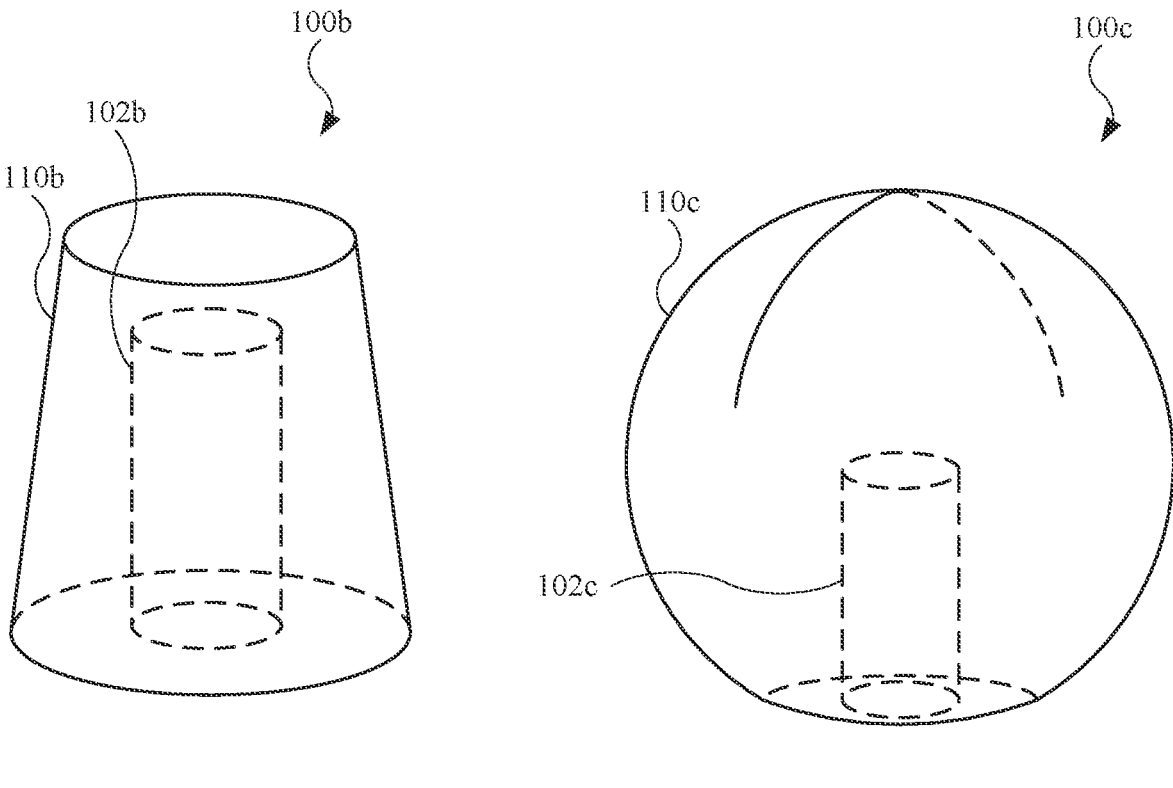
*FIG. 1B*
*FIG. 1C*

ELECTRONIC DEVICES WITH MODIFIED COVERS

CROSS-REFERENCE TO RELATED APPLICATION(S)

The present application claims the benefit of U.S. Provisional Application No. 63/406,654, entitled "ELECTRONIC DEVICE WITH MODIFIED COVER," filed Sep. 14, 2022, the content of which is incorporated herein by reference in its entirety for all purposes.

TECHNICAL FIELD

This application is directed to electronic devices, and in particular, to covers used with electronic devices.

BACKGROUND

Some electronic devices (e.g., home assistants) used a material to surround internal components. Some materials may include rectangular pieces that are adjoined at opposite ends and subsequently positioned over the internal components.

BRIEF DESCRIPTION OF THE DRAWINGS

Certain features of the subject technology are set forth in the appended claims. However, for purpose of explanation, several embodiments of the subject technology are set forth in the following figures.

FIG. 1A, FIG. 1B, and FIG. 1C illustrate example electronic devices, in accordance with aspects of the present disclosure.

DETAILED DESCRIPTION

Figure 2:
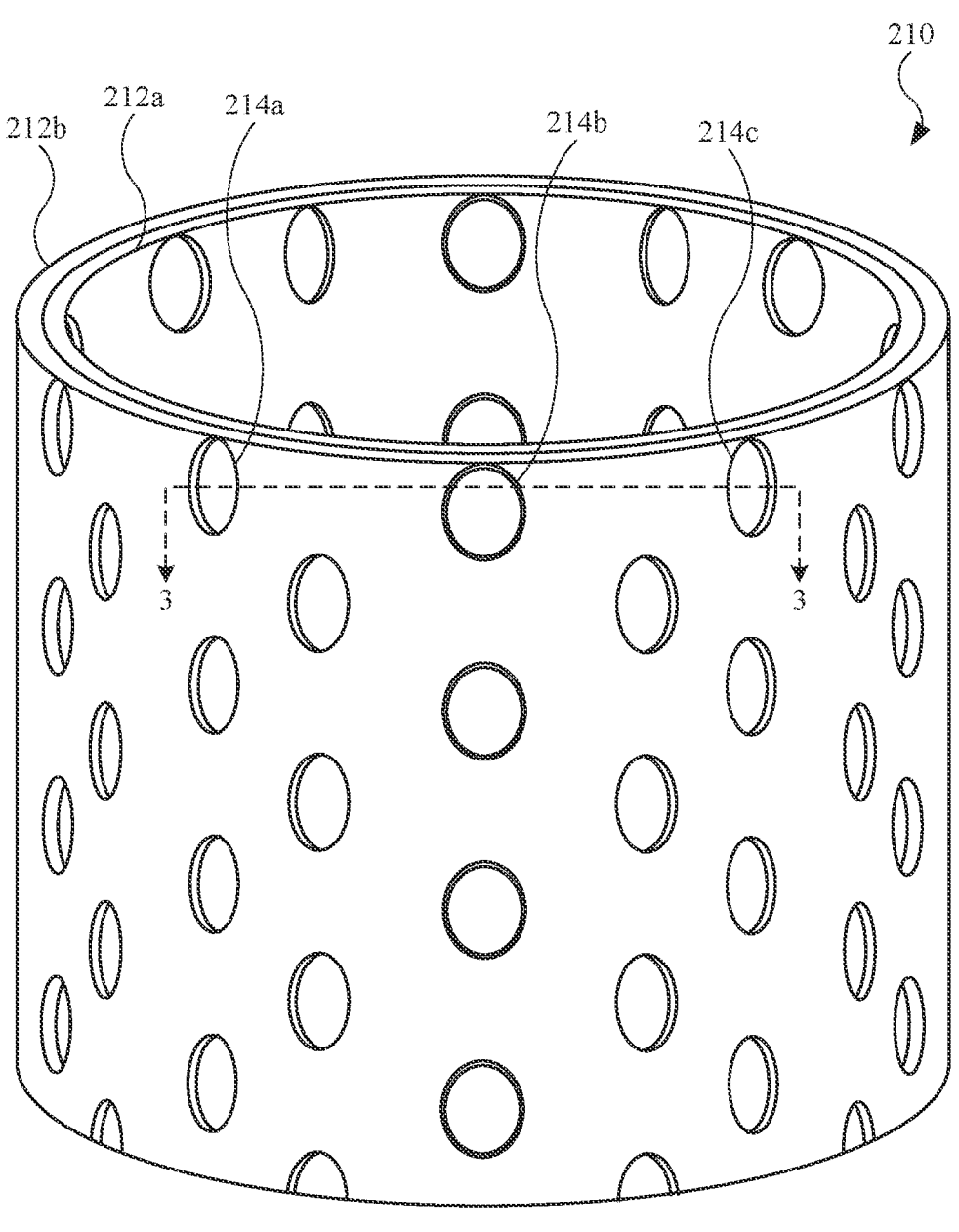
FIG. 2 illustrates a perspective view of a fabric assembly for an electronic devices, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Electronic devices, such as home assistants or smart home assistants, can output soundwaves (e.g., acoustic energy), perform a number of tasks, and provide machine-learning capabilities. For example, electronic devices described herein may include a microphone that listens for audio signals corresponding to a command and processes the command. Additionally, electronic devices described herein include one or more speakers designed to play media files (e.g., audio files). Also, electronic devices described herein can make inferences or learn from past commands and other audio signals, and perform certain tasks without receiving commands or instructions.

The subject technology is directed to covers for electronic devices. Some covers described herein may include multiple fabric layers bonded, or mated, together at certain locations. For example, a pair of fabric layers may include multiple indentations formed by a de-boss operation. The respective indentations can be bonded together through a welding operation, such as radio frequency (RF) welding as a non-limiting example. Additionally, the fabric layers may be formed through a circular knit operation. Beneficially, the fabric layers may lack seams and other material inconsistencies associated with a seam.

The fabric layers described may include indentations that are equally spaced apart, unequally spaced apart, or with portions having equal and unequal spacing. For example, the density of indentations, defined by the pitch between adjacent indentations, may be consistent for a fabric layer. Alternatively, the density of indentations may change to accommodate certain components of an electronic device, such as a speaker(s) or a display(s) of the electronic device. In this regard, the fabric assembly may include few or no indentations at locations corresponding to the electronic components. Beneficially, the relatively few indentations may provide enhanced access to a display by a user, or less impeded soundwaves as the presence of indentations and associated welds is reduced.

These and other embodiments are discussed below with reference to FIGS. 1-12. However, those skilled in the art will readily appreciate that the detailed description given herein with respect to these Figures is for explanatory purposes only and should not be construed as limiting.

According to some embodiments, for example as shown in FIG. 1A, an electronic device 100a takes the form of a home assistant or smart home assistant. The electronic device 100a may include electronic components 102a (shown as a dotted line). The electronic components 102a may include, but is not limited to, circuit boards, processor circuits (e.g., control circuitry, MEMS circuitry, central processing unit), memory circuits, and audio transducers (e.g., microphones, speakers) operatively coupled together by cables and/or flexible circuits.

The electronic device 100a includes a fabric assembly 110a that forms a cover for the electronic components 102a. The fabric assembly 110a may include multiple fabric layers that are bonded together at various locations. For example, as shown in the enlarged view, the fabric assembly 110a includes a fabric layer 112a with an indentation 114a and an indentation 114b (representative of additional indentations). The indentations 114a and 114b may be bonded to respective indentations of another fabric layer (not shown in FIG. 1A) of the fabric assembly 110a.

The electronic device 100a includes a cylindrical body. However, other shapes are possible. For example, referring to FIG. 1B, an electronic device 100b takes the form of a trapezoidal cylinder. Similar to the electronic device 100a in FIG. 1A, the electronic device 100b includes electronic components 102b and a fabric assembly 110b that covers the electronic components 102b. Referring to FIG. 1C, an electronic device 100c takes the form of a spherical, or substantially spherical, body. Similar to the electronic device 100a in FIG. 1A, the electronic device 100c includes electronic components 102c and a fabric assembly 110c that covers the electronic components 102c. The electronic devices 100a, 100b, and 100c may include one or more structural components (not shown), such as frames or molded bodies, that allow the electronic devices 100a, 100b, and 100c to take their respective shapes. Further, the fabric assemblies 110a, 110b, and 110c may substantially cover the entire portion of their respective electronic devices, or alternately in some cases, may cover limited portions. For example, the curved region of the electronic device 100a in FIG. 1A may be covered by the fabric assembly 110a, while the top and bottom regions (e.g., flat regions) of the electronic device 100a may be uncovered by the fabric assembly 110a.

Referring to FIG. 2, a fabric assembly 210 is shown. The fabric assembly 210 includes a fabric layer 212a and a fabric layer 212b. The fabric layers 212a and 212b (as well as other fabric layers described herein) may include one or more textiles, including yarn or interlaced fibers, as non-limiting examples. As shown, the fabric layer 212a surrounds, or covers, the fabric layer 212b. Put another way, the fabric layer 212b is surrounded, or covered, by the fabric layer 212a. Accordingly, the fabric layer 212a and the fabric layer 212b may be referred to as an outer layer and an inner layer, respectively. Alternatively, the fabric layer 212a and the fabric layer 212b may be referred to as a first layer and a second layer, respectively. Also, each of the fabric layers 212a and 212b may be formed by a circular knit operation, and may each be referred to as a circular knit fabric. As a result, each of the fabric layers 212a and 212b may be formed through knitting a material in a continuous circle to form a tubular, or tube-like, structure. Beneficially, each of the fabric layers 212a and 212b may lack a seam that is traditionally used two secure to ends of a fabric together, and the overall appearance of each of the fabric layers 212a and 212b may be enhanced.

Also, each of the fabric layers 212a and 212b may include the same material or materials. However, in some embodiments, the material makeup of the fabric layers 212a and 212b may differ. For example, the appearance or the color of each of the fabric layers 212a and 212b may differ. Moreover, the stitch density, or loop density, of the fabric layers 212a and 212b may differ. In this regard, the fabric layer 212a may include a stitch density that is less than that of the fabric layer 212b. As a result, the fabric layer 212a may be relatively transparent, thus allowing greater visibility of the fabric layer 212b (when looking through the fabric layer 212a). Also, when the appearance or color of the fabric layers 212a and 212b differ, the contrast may be more apparent based on the disparate stitch density.

Each of the fabric layers 212a and 212b includes multiple indentations. For example, the fabric layer 212a includes an indentation 214a, an indentation 214b, and an indentation 214c (representative of additional indentations of the fabric layers 212a and 212b). The indentations may be formed in the fabric layers 212a and 212b by a de-boss operation, as a non-limiting example. The de-boss operation may be performed by a machine tool (not shown) that indents the fabric layers 212a and 212b with a desired shape. As shown, the indentations are circular, or substantially circular. However, other shapes are possible.

Figure 3:
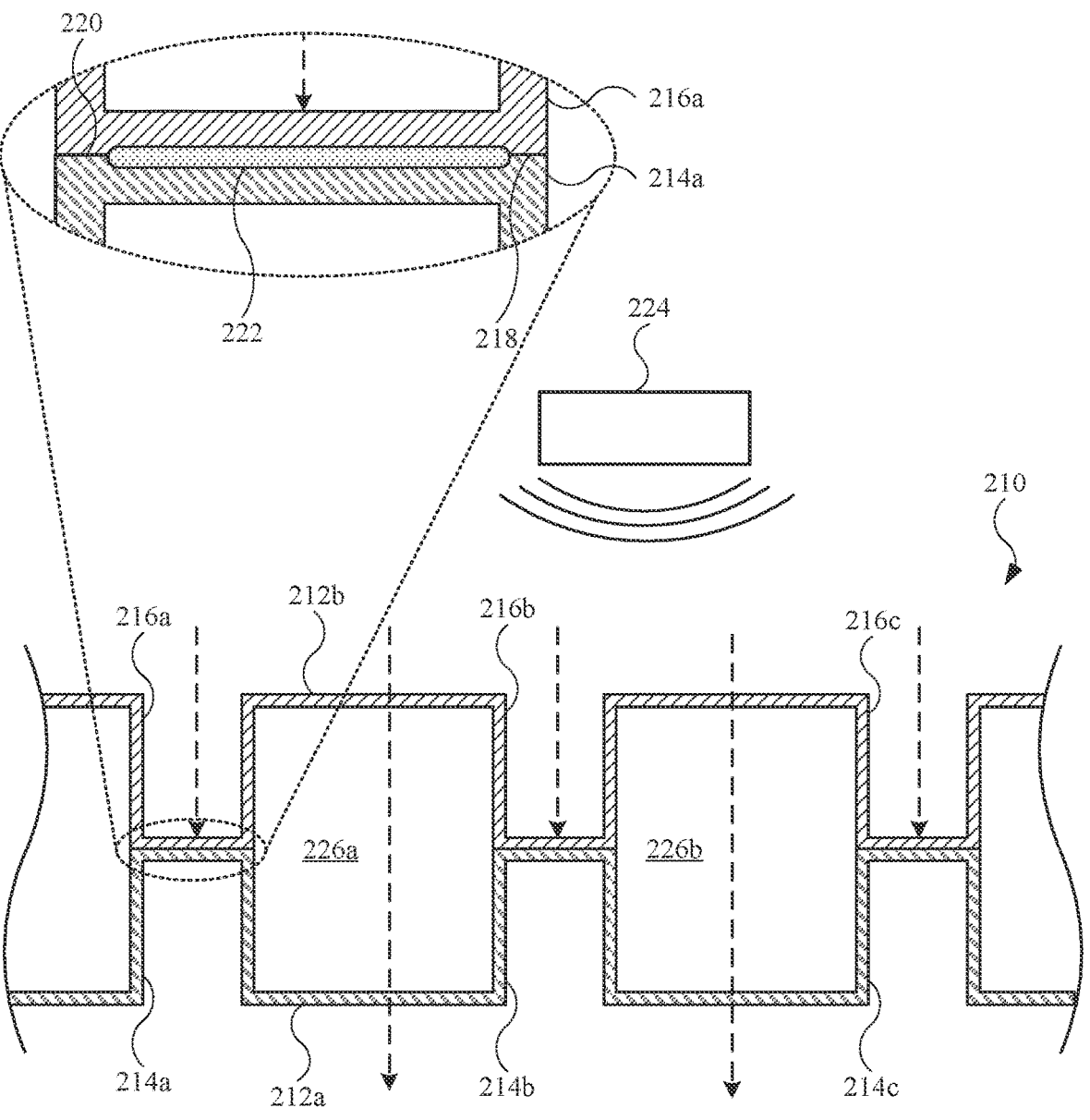
FIG. 3 illustrates a cross-sectional view of the fabric assembly taken along line 3-3 in FIG. 2, in accordance with aspects of the present disclosure.

Referring to FIG. 3, a cross section of the fabric assembly 210 is shown. Several indentations of the fabric layer 212a are abutted, or engaged, with respective indentations of the fabric layer 212b. For example, the indentations 214a, 214b, and 214c of the fabric layer 212a engage an indentation 216a, an indentation 216b, and an indentation 216c, respectively, of the fabric layer 212b.

When respective indentations of the fabric layers 212a and 212b are abutted together, the indentations may undergo a welding operation to join the fabric layers 212a and 212b together at the indentations. As a non-limiting example, the welding operation may include an RF welding operation, such as ultrasonic welding. Accordingly, ultrasonic acoustic vibrations can be used to secure the fabric layers 212a and 212b together. As shown in the enlarged view, the indentation 214a includes a surface 218 and the indentation 214a includes a surface 220. A welding operation used to secure the indentation 214a and the indentation 216a at the surface 218 and the surface 220, respectively, results in a bond 222. The bond 222 may include a weld, including a solid-state weld, that holds the indentations 214a and 216a together without an adhesive. Accordingly, the bond 222 is located at the surfaces 218 and 220. The remaining indentations may also be bonded in a similar manner. Alternative to a welding operation, other methods (e.g., adhesives) can be used.

The fabric assembly 210 is designed to permit passage of soundwaves. In this regard, a speaker 224 generating sound (i.e., audible sound) creates soundwaves that pass through voids, or spaces, between indentations. For example, the soundwaves (represented by arrows with dotted lines) pass through the fabric assembly 210 at a void 226a and a void 226b of the fabric assembly 210. The voids 226a and 226b (representative of additional voids) include areas between adjacent indentations of the fabric layers 212a and 212b, and thus are locations associated without indentations. As a result, the voids 226a and 226b represent unobstructed pathways for the soundwaves, as bonds (e.g., bond 222) are not present. Accordingly, the bonds used to secure indentations may allow limited soundwave throughput, or even fully obstruct the pathway of the soundwaves, through the fabric assembly 210.

Figure 4:
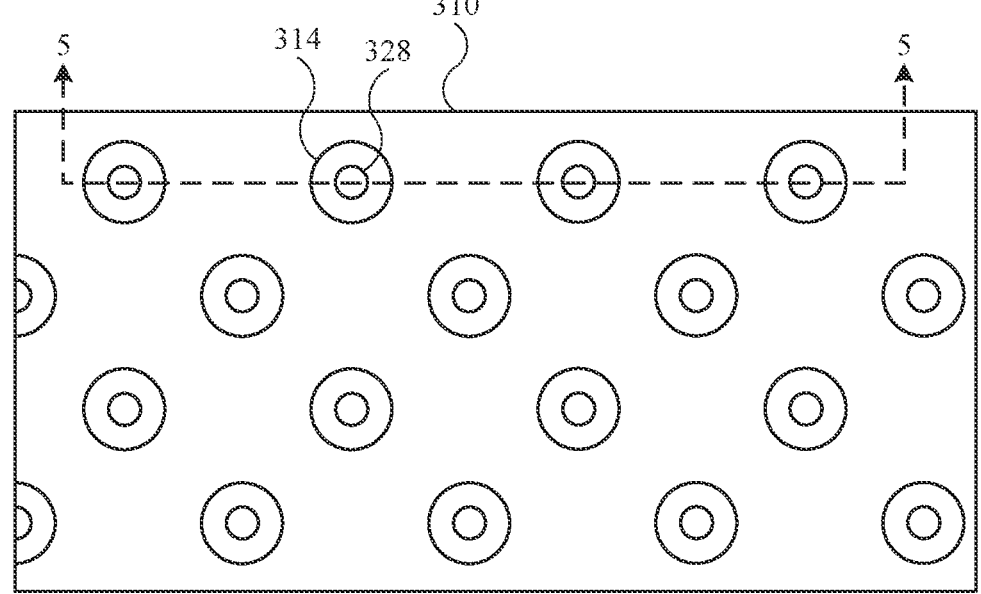
FIG. 4 illustrates a plan view of a fabric assembly with openings formed therein, in accordance with aspects of the present disclosure.

Referring to FIG. 4, a fabric assembly 310 is modified with through holes, or openings, of the fabric layers. For example, an indentation 314 (representative of additional indentations) includes a through hole 328 (representative of additional through holes).

Figure 5:
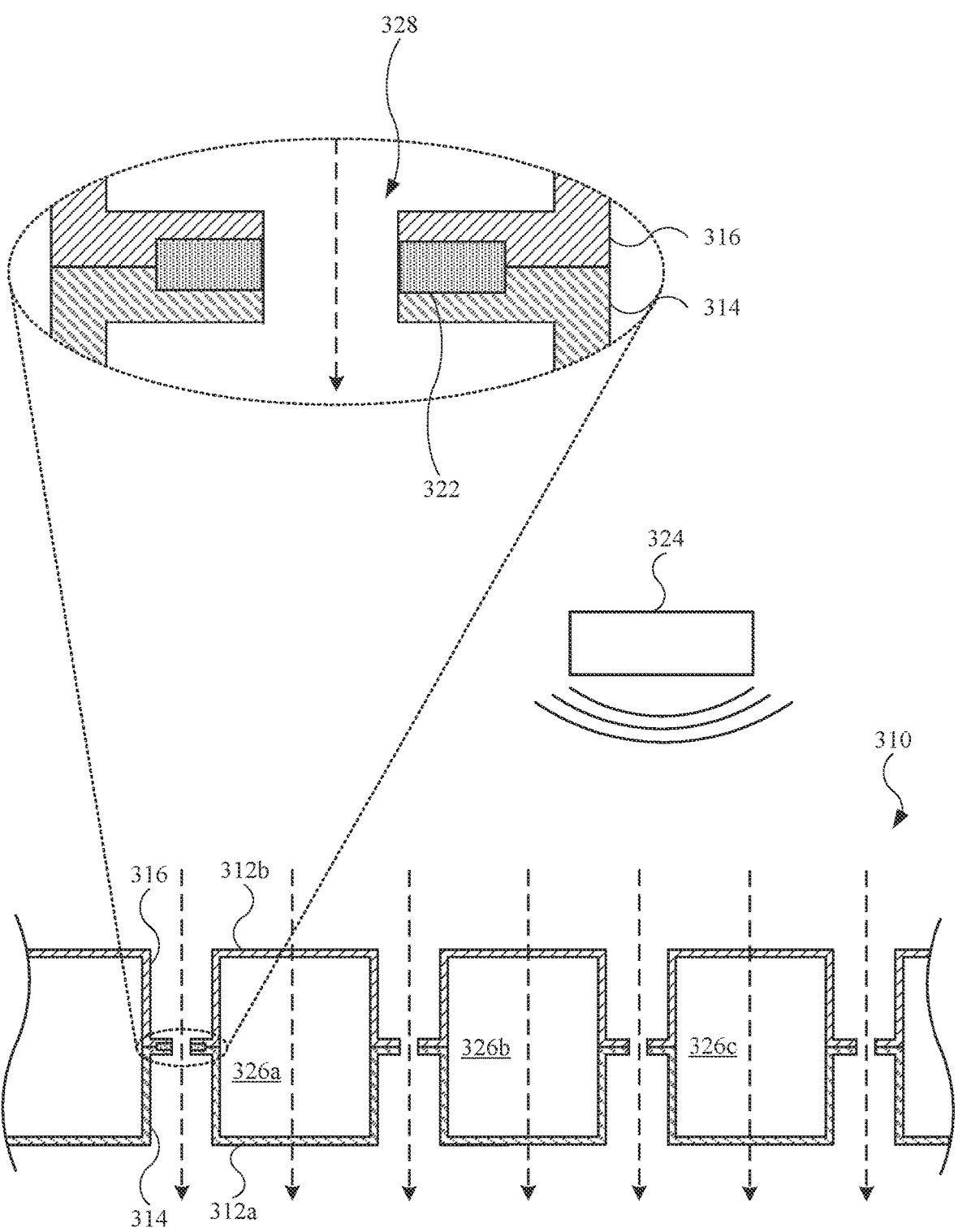
FIG. 5 illustrates a cross-sectional view of the fabric assembly taken along line 4-4 in FIG. 2, in accordance with aspects of the present disclosure.

Referring to FIG. 5, a cross section of the fabric assembly 310 is shown. The fabric assembly 310 includes a fabric layer 312a and a fabric layer 312b having an indentation 314 and an indentation 316, respectively. As shown in the enlarged view, the through hole 328 passes through the fabric layers 312a and 312b at the indentations 314 and 316, respectively. Further, the indentions 314 and 316 are maintained together by a bond 322, and the through hole 328 passes through the bond 322. Accordingly, soundwaves (represented by arrows with dotted lines) generated by a speaker 324 pass through not only voids (e.g., void 326a, void 326b, and void 326c) of the fabric assembly 310, but also through the through hole 328 as well as other through holes (not labeled).

The through hole 328, as well as additional through holes, may be formed in indentations at locations corresponding to the location of the speaker 324 in an electronic device (not shown in FIG. 5). In this regard, through holes in the fabric assembly 310 can be selectively formed in the indentations in a location proximate to the speaker 324, while other indentations (i.e., indentations not located proximate to the speaker 324) of the fabric assembly 310 do not include a through hole. Alternatively, all indentations of the fabric assembly 310 may include a through hole.

Figure 6:
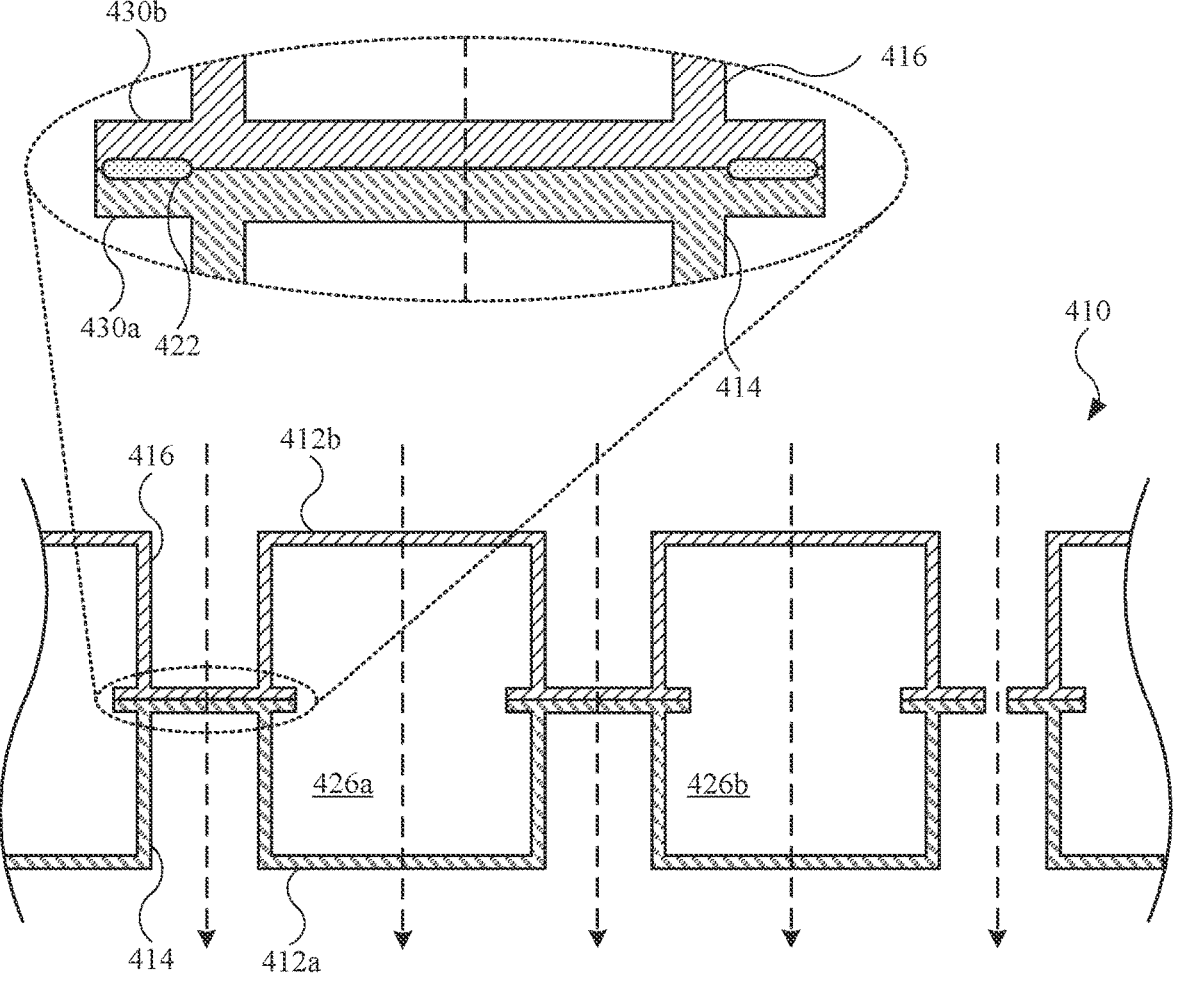
FIG. 6 illustrates a cross-sectional view of a fabric assembly with indentations that include flanges, in accordance with aspects of the present disclosure.

Referring to FIG. 6, a fabric assembly 410 includes fabric layers with indentations modified with flanges. For example, the fabric assembly 410 includes a fabric layer 412a and a fabric layer 412b. The fabric layer 412a includes an indentation 414 and the fabric layer 412b includes an indentation 416 that engages the indentation 414. As shown in the enlarged view, a flange 430a is integrated with the indentation 414 and a flange 430b is integrated with the indentation 416. The flanges 430a and 430b (representative of additional flanges) each represent additional material circumferentially located around the indentation 414 and the indentation 416, respectively. Also, the indentations 414 and 416 are connected by a bond 422 located between the flanges 430a and 430b. The bond 422 (representative of additional bonds) may extend circumferentially around the indentations 414 and 416 with the flanges 430a and 430b. In this regard, soundwaves (represented by arrows with dotted lines) generated by a speaker (not shown in FIG. 6) pass through not only voids (e.g., void 426a and void 426b) of the fabric assembly 410, but also through the indentations 414 and 416, as the bond 422 does not obstruct the soundwaves.

Figure 7:
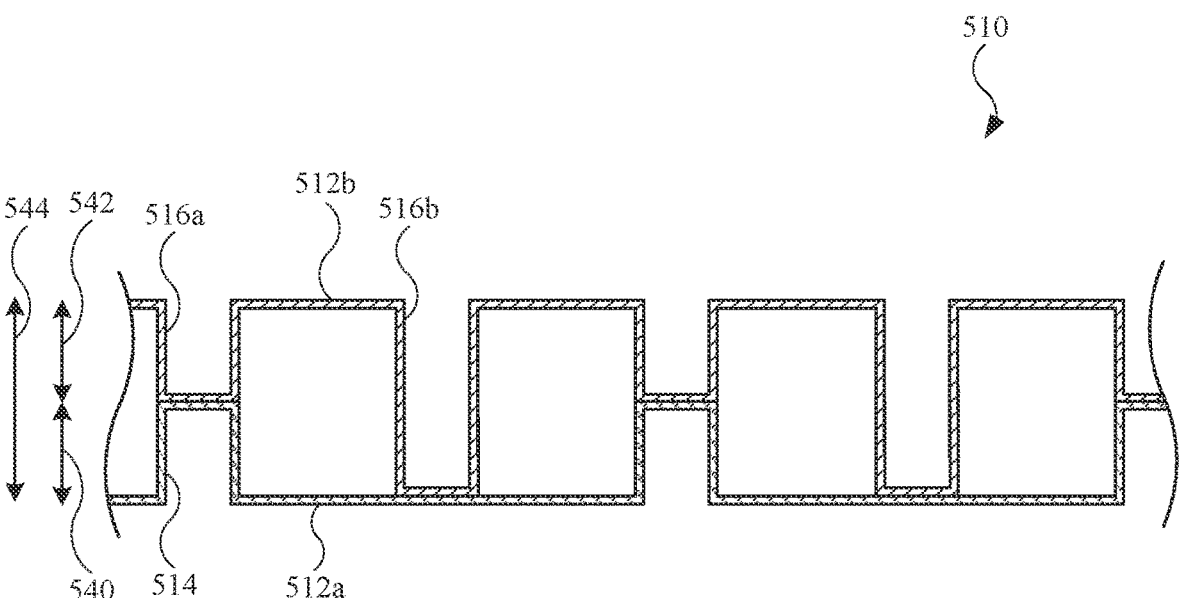
FIG. 7 illustrates a cross-sectional view of a fabric assembly with alternate indentation features, in accordance with aspects of the present disclosure.

Referring to FIG. 7, a fabric assembly 510 includes modified indentations. As shown, a fabric layer 512a includes an indentation 514 and the fabric layer 512b includes an indentation 516a that engages the indentation 514. Additionally, the fabric layer 512b includes an indentation 516b that does not engage a corresponding indentation of the fabric layer 512a. In this regard, the indentations may include different dimensional properties. For example, the indentation 514 includes a dimension 540, or height, and the indentation 516a includes a dimension 542, or height. The dimensions 540 and 542 are approximately equal. However, the indentation 516b includes a dimension 544, or height, that is greater than each of the dimensions 540 and 542. As shown, the indentation 516b extends to, and engages, the fabric layer 512a based on the dimension 544 of the indentation 516b.

While the fabric layer 512b of the fabric assembly 510 includes indentations of differing dimensions that alternates in a sequential manner (e.g., every other indentation), it should be noted that the fabric layer 512b may include one or more sets of relatively long indentations, similar to that of the indentation 516b, that generally form any desired pattern. Such patterns may include indentations of different dimensions formed in a non-sequential manner. Also, although not shown, the fabric layer 512a may include modified indentations similar to those shown and described for the fabric layer 512b, and may include non-sequentially formed indentations.

Figure 8:
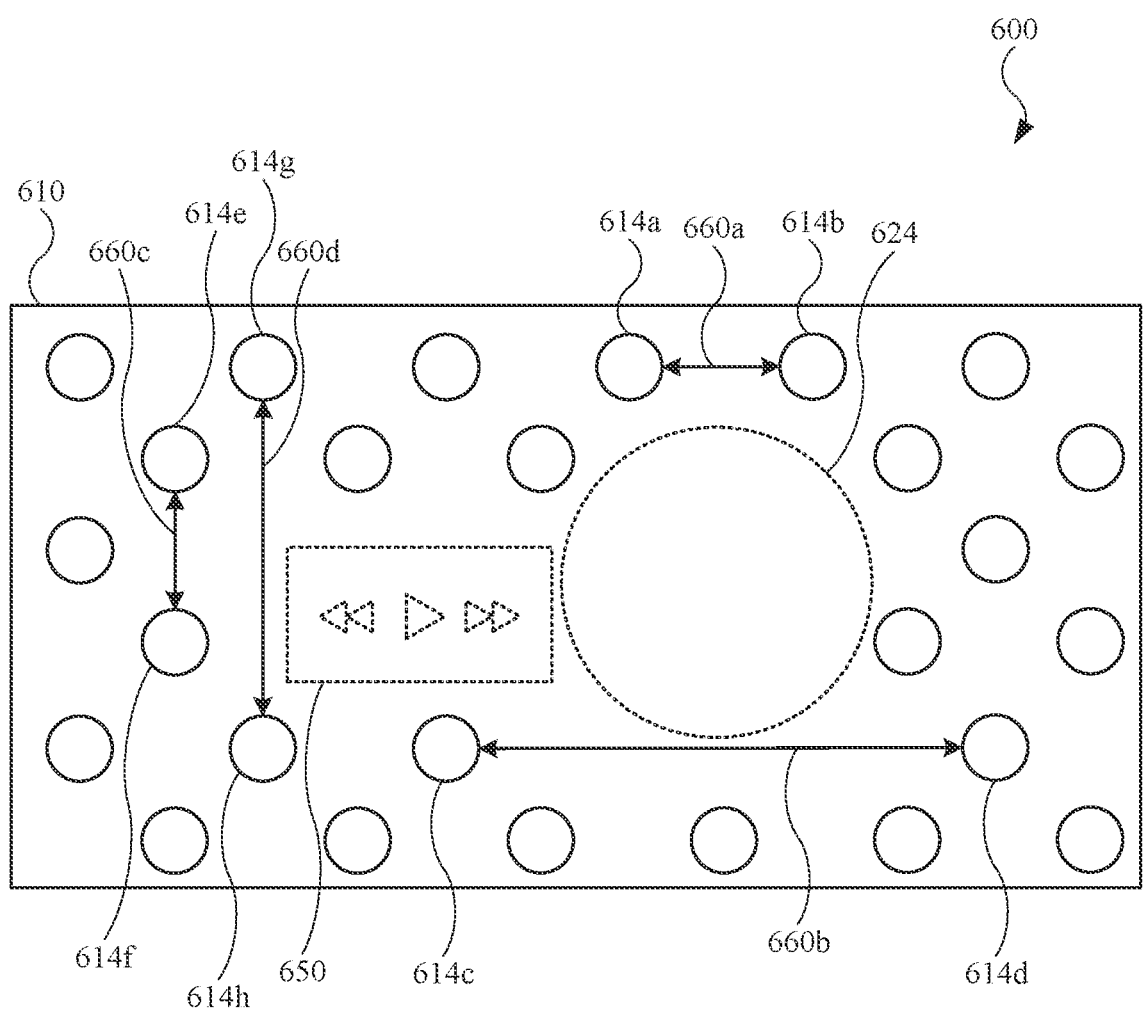
FIG. 8 illustrates a plan view of an electronic device that includes a fabric assembly with certain locations lacking indentations, in accordance with aspects of the present disclosure.

Referring to FIG. 8, a portion of an electronic device 600 is shown. The electronic device 600 includes a fabric assembly 610. Although not expressly shown, the fabric assembly 610 may include multiple fabric layers, similar to previous embodiments shown and described for a fabric assembly. In addition to having a fabric assembly 610 with several indentations, the electronic device 600 includes multiple electronic components. For example, the electronic device 600 includes a speaker 624 and a display 650, each of which is covered by the fabric assembly 610. The speaker 624 is designed to generate soundwaves. In order for a user to control the speaker 624, the display 650 may present visual information in the form of selectable inputs for the user to depress. In this regard, the display 650 may include a capacitive, touch-sensitive display. As shown, several icons (e.g., play, fast forward, and rewind) are presented on the display 650. Although not shown, other icons (e.g., volume up, volume down) can also be presented on the display 650. Also, although not shown, the electronic device 600 may include one or more buttons and/or switches covered by the fabric assembly 610.

In order to accommodate the speaker 624 and the display 650, the indentations formed in the fabric assembly 610 may not be present at locations of the fabric assembly 610 corresponding to the speaker 624 and the display 650. As a result, the density of indentations may vary in the fabric assembly 610. For example, the fabric assembly 610 includes an indentation 614a and an indentation 614b located in a row of indentations, as well as an indentation 614c and an indentation 614d located in another row of indentations. The indentations 614a and 614b are separated by a dimension 660a (e.g., pitch), while the indentations 614c and 614d are separated by a dimension 660b that is greater than the dimension 660a. The disparity in the pitch between adjacent indentations in different rows allows for an unobstructed region of the fabric assembly 610 for the speaker 624.

Similarly, the fabric assembly 610 includes an indentation 614e and an indentation 614f located in a column of indentations, as well as an indentation 614g and an indentation 614h located in another column of indentations. The indentations 614e and 614f are separated by a dimension 660c, while the indentations 614g and 614h are separated by a dimension 660d that is greater than the dimension 660c. The disparity in the pitch between adjacent indentations in different columns allows for an unobstructed region of the fabric assembly 610 for the display 650.

While FIG. 8 shows the speaker 624 and the display 650 uncovered by indentations, it should be noted that at last some indentations may cover the speaker 624 and the display 650. For example, one or more indentations may, at a relatively low density of indentations, can be formed in the fabric assembly 610 at locations of the fabric assembly 610 that cover the speaker 624 and the display 650.

Figure 9:
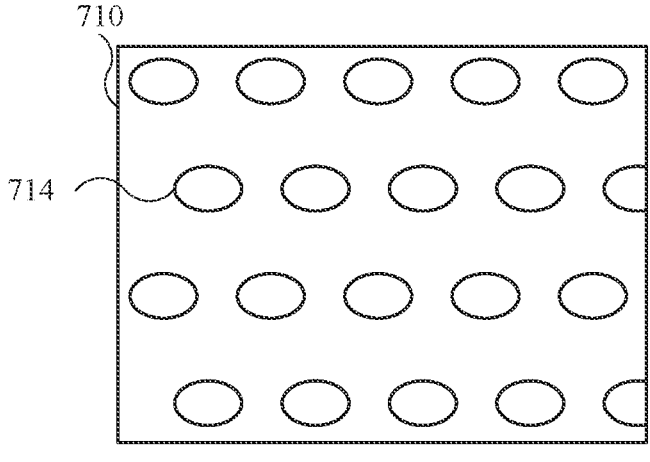
FIG. 9, FIG. 10, and FIG. 11 illustrate a plan view of fabric assembly with another alternate indentation shape, in accordance with aspects of the present disclosure.
Figure 10:
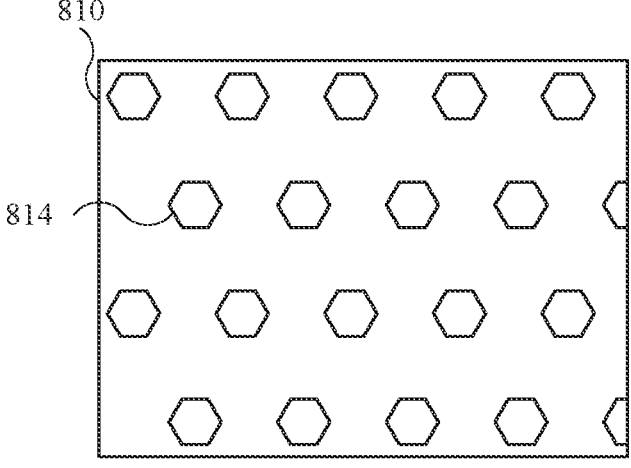
Figure 11:
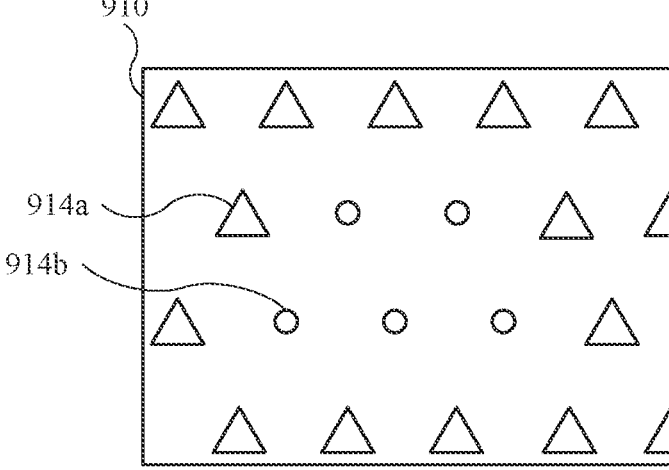

FIGS. 9-11 show and describe fabric assemblies having indentations of different shapes and sizes. The fabric assemblies shown and described in FIGS. 9-11 can be integrated with electronic devices shown and described herein. Also, although not expressly shown, fabric assemblies in FIGS. 9-11 may include multiple fabric layers.

Referring to FIG. 9, a fabric assembly 710 includes an indentation 714 (representative of additional indentations) with an oblong shape. Accordingly, fabric assemblies may include indentations with rounded shapes other than circular shapes. Referring to FIG. 10, a fabric assembly 810 includes an indentation 814 (representative of additional indentations) with a hexagonal shape. In this regard, fabric assemblies may include indentations with polygonal shapes, some of which may include shapes with 3 or more sides. Referring to FIG. 11, a fabric assembly 910 includes an indentation 914a (representative of additional indentations) with a triangular shape, as well as an indentation 914*b* (representative of additional indentations) with a circular shape. Also, the size (e.g., area) of the indentation 914*a* is greater than that of the indentation 914*b*. In this regard, fabric assemblies may include indentations with multiple different shapes, and with different areas.

Figure 12:
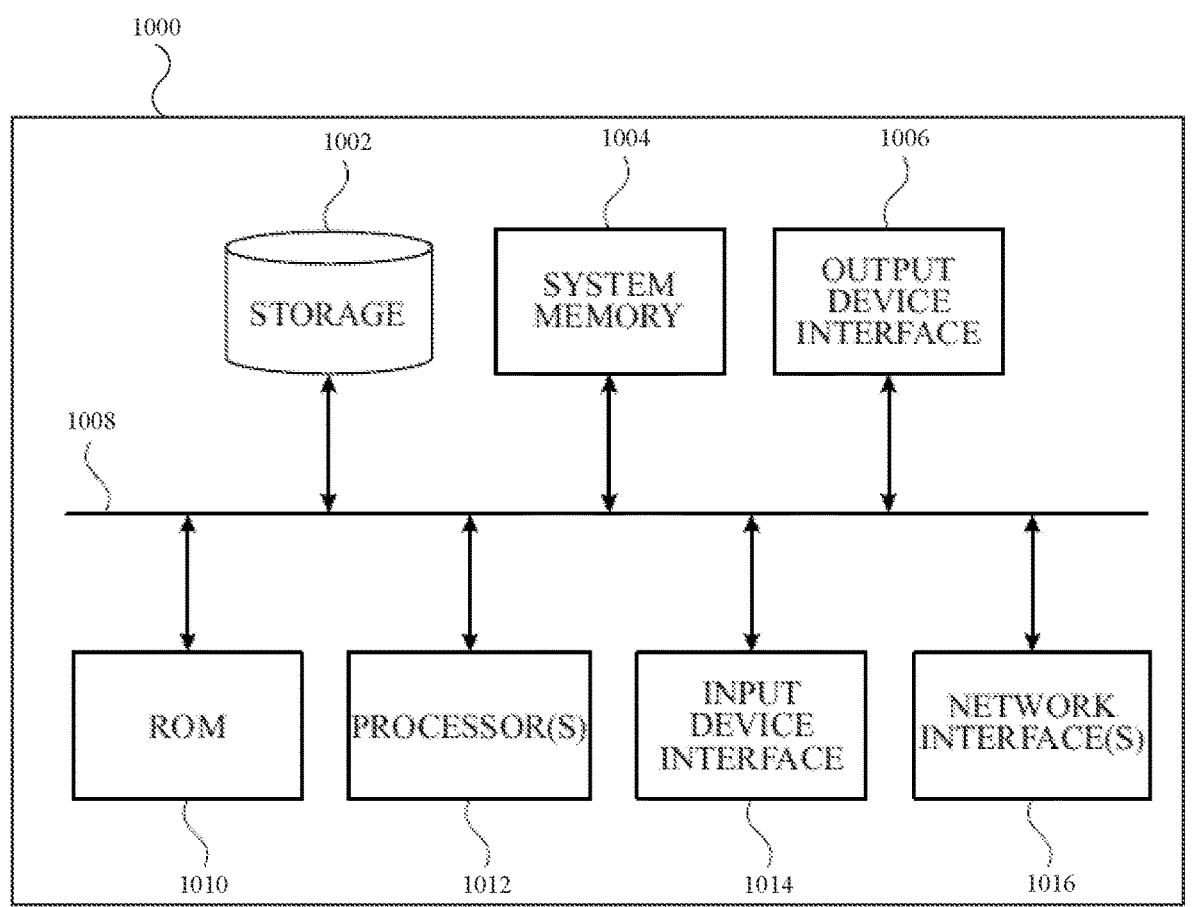
FIG. 12 illustrates a schematic diagram of an electronic system, in accordance with aspects of the present disclosure.

Referring to FIG. 12, an electronic system 1000 with which one or more implementations of the subject technology may be implemented is shown. The electronic system 1000 can be the electronic devices 100*a*, 100*b*, and 100*c*, as shown in FIGS. 1A-1C, respectively. The electronic system 1000 may include various types of computer readable media and interfaces for various other types of computer readable media. The electronic system 1000 includes a bus 1008 that places in communication a permanent storage device 1002, a system memory 1004 (and/or buffer), an output device interface 1006, a read-only memory (ROM) 1010, one or more processing unit(s) 1012, an input device interface 1014, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010 (which are each implemented as a non-transitory computer-readable medium). From these various memory units, the one or more processing unit(s) 1012 retrieves instructions to execute and data to process in order to execute the processes of one or more implementations.

The bus 1008 also connects to the input device interface 1014 and the output device interface 1006. The input device interface 1014 enables a user to communicate information and select commands to the electronic system 1000. Input devices that may be used with the input device interface 1014 may include, for example, alphanumeric keyboards and pointing devices (also called "cursor control devices").

The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1008 also couples the electronic system 1000 to one or more networks and/or to one or more network nodes through the one or more network interfaces 1016. In this manner, the electronic system 1000 can be a part of a network of computers (such as a LAN, a wide area network ("WAN")), or an Intranet, or a network of networks, such as the Internet. Any or all components of the electronic system 1000 can be used in conjunction with the subject disclosure.

Various examples of aspects of the disclosure are described below as clauses for convenience. These are provided as examples, and do not limit the subject technology.

Clause A: An electronic device, comprising: a fabric assembly that at least partially covers electronic components, the fabric assembly comprising: a first fabric layer comprising a first indentation; and a second fabric layer comprising a second indentation joined with the first indentation.

Clause B: A fabric assembly for an electronic device, the fabric assembly comprising: a first fabric layer comprising a first indentation; and a second fabric layer comprising a second indentation, wherein the first fabric layer is secured with the second fabric layer at a bond between the first indentation and the second indentation.

Clause C: A fabric assembly for an electronic device, the fabric assembly comprising: a first circular knit fabric that forms an opening for electronic components of the electronic device; and a second circular knit fabric that is surrounded by, and bonded to, the first circular knit fabric.

One or more of the above clauses can include one or more of the features described below. It is noted that any of the following clauses may be combined in any combination with each other, and placed into a respective independent clause, e.g., clause A, B, or C.

Clause 1: wherein: the electronic components comprise: a processor circuit; and an audio transducer operatively coupled to the processor circuit, the audio transducer comprises a speaker; and the fabric assembly permits passage of soundwaves generated by the speaker.

Clause 2: wherein: the first fabric layer comprises a third indentation, the second fabric layer comprises fourth indentation joined with the third indentation, the first indentation is bonded with the second indentation at a first bond, and the third indentation is bonded with the fourth indentation at a second bond.

Clause 3: wherein the fabric assembly i) permits passage of the soundwaves between the first bond and the second bond and ii) limits passage of the soundwaves between at the first bond and at the second bond.

Clause 4: wherein: the first fabric layer comprises a first circular knit fabric, and the second fabric layer comprises a second circular knit fabric.

Clause 5: wherein the first fabric layer at least partially covers the second fabric layer.

Clause 6: wherein: the first indentation defines a first surface, and the second indentation defines a second surface that is bonded to the first surface.

Clause 7: wherein the first surface is bonded to the second surface without an adhesive.

Clause 8: further comprising a through hole that extends through the first surface and the second surface.

Clause 9: wherein: the first indentation comprises a first flange, and the second indentation comprises a second flange that is bonded to the first flange.

Clause 10: further comprising a display covered by the fabric assembly.

Clause 11: wherein: the first indentation defines a first surface, the second indentation defines a second surface, and the bond is located at the first surface and the second surface.

Clause 12: wherein: the first indentation comprises a first flange, the second indentation comprises a second flange, and the bond is located at the first flange and the second flange.

Clause 13: further comprising a through hole formed through the bond.

Clause 14: wherein the bond comprises a weld.

Clause 15: further comprising: a first indentation formed in the first circular knit fabric; and a second indentation formed in the second circular knit fabric, wherein the first indentation is joined to the second indentation.

Clause 16: further comprising a third indentation formed in the first circular knit fabric, wherein the third indentation extends to the second circular knit fabric and is longer than the first indentation.

Clause 17: wherein the first circular knit fabric combines with the second circular knit fabric to form a cylindrical body.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An electronic device, comprising:
   a fabric assembly that at least partially covers electronic components, the fabric assembly comprising:
   a first fabric layer comprising a first indentation that defines a first surface; and
   a second fabric layer comprising a second indentation that defines a second surface that is bonded with the first indentation.

2. The electronic device of claim 1, wherein:

the electronic components comprise:

a processor circuit; and an audio transducer operatively coupled to the processor circuit, the audio transducer comprising a speaker; and the fabric assembly permits passage of soundwaves generated by the speaker.

3. The electronic device of claim 2, wherein:

the first fabric layer comprises a third indentation, the second fabric layer comprises fourth indentation joined with the third indentation, the first indentation is bonded with the second indentation at a first bond, and the third indentation is bonded with the fourth indentation at a second bond.

4. The electronic device of claim 3, wherein the fabric assembly i) permits passage of the soundwaves between the first bond and the second bond and ii) limits passage of the soundwaves between at the first bond and at the second bond.

5. The electronic device of claim 1, wherein:

the first fabric layer comprises a first circular knit fabric, and the second fabric layer comprises a second circular knit fabric.

6. The electronic device of claim 1, wherein the first fabric layer at least partially covers the second fabric layer.

7. The electronic device of claim 1, wherein the first fabric layer and the second fabric layer further define a void configured to permit passage of soundwaves.

8. The electronic device of claim 1, wherein the first surface is bonded to the second surface without an adhesive.

9. The electronic device of claim 1, further comprising a through hole that extends through the first surface and the second surface.

10. The electronic device of claim 1, wherein:

the first indentation comprises a first flange, and the second indentation comprises a second flange that is bonded to the first flange.

11. The electronic device of claim 1, further comprising a display covered by the fabric assembly.

12. A fabric assembly for an electronic device, the fabric assembly comprising:

a first fabric layer comprising a first indentation; and a second fabric layer comprising a second indentation, wherein the first fabric layer is secured with the second fabric layer at a bond between the first indentation and the second indentation.

13. The fabric assembly of claim 12, wherein:

the first indentation defines a first surface, the second indentation defines a second surface, and the bond is located at the first surface and the second surface.

14. The fabric assembly of claim 12, wherein:

the first indentation comprises a first flange, the second indentation comprises a second flange, and the bond is located at the first flange and the second flange.

15. The fabric assembly of claim 12, further comprising a through hole formed through the bond.

16. The fabric assembly of claim 12, wherein the bond comprises a weld.

17. A fabric assembly for an electronic device, the fabric assembly comprising:

a first circular knit fabric that forms an opening for electronic components of the electronic device; and a second circular knit fabric that is surrounded by, and bonded to, the first circular knit fabric.

18. The fabric assembly of claim 17, further comprising:

a first indentation formed in the first circular knit fabric; and a second indentation formed in the second circular knit fabric, wherein the first indentation is joined to the second indentation.

19. The fabric assembly of claim 18, further comprising a third indentation formed in the first circular knit fabric, wherein the third indentation extends to the second circular knit fabric and is longer than the first indentation.

20. The fabric assembly of claim 17, wherein the first circular knit fabric combines with the second circular knit fabric to form a cylindrical body.

* * * * *